US010751621B2

(12) United States Patent
Ratelle et al.

(10) Patent No.: US 10,751,621 B2
(45) Date of Patent: Aug. 25, 2020

(54) METHOD AND SYSTEM FOR RENDERING VIDEO GAME IMAGES

(71) Applicant: SQUARE ENIX LTD, London (GB)

(72) Inventors: Kevin Ratelle, Montreal (CA); Frederic Joanis, Montreal (CA)

(73) Assignee: Square Enix Limited, London (GB)

(*) Notice: Subject to any disclaimer, the term of this patent is extended or adjusted under 35 U.S.C. 154(b) by 121 days.

(21) Appl. No.: 15/694,574

(22) Filed: Sep. 1, 2017

(65) Prior Publication Data
US 2019/0070505 A1    Mar. 7, 2019

(51) Int. Cl.
*G06T 15/20*    (2011.01)
*G06T 19/00*    (2011.01)
*G06T 13/40*    (2011.01)
*A63F 13/525*   (2014.01)
*A63F 13/577*   (2014.01)
*A63F 13/57*    (2014.01)
*G06T 19/20*    (2011.01)

(52) U.S. Cl.
CPC ............ *A63F 13/525* (2014.09); *A63F 13/57* (2014.09); *A63F 13/577* (2014.09); *G06T 13/40* (2013.01); *G06T 15/20* (2013.01); *G06T 19/003* (2013.01); *G06T 19/20* (2013.01); *G06T 2210/21* (2013.01); *G06T 2219/2016* (2013.01)

(58) Field of Classification Search
CPC ...... A63F 13/525; A63F 13/57; A63F 13/577; G06T 13/40; G06T 15/20; G06T 19/003; G06T 19/20; G06T 2219/2016; G06T 2210/21
See application file for complete search history.

(56) References Cited

U.S. PATENT DOCUMENTS 6,014,145 A * 1/2000 Bardon ............... G06T 15/10
                                                    345/427
7,403,202 B1 * 7/2008 Nash .................. G06T 13/40
                                                    345/474

(Continued)

OTHER PUBLICATIONS

Ding, Lin, et al. "Geometrical shapes and swaying movements of realistic tree: design and implementation." Proceedings of the 8th International Conference on Virtual Reality Continuum and its Applications in Industry. ACM, 2009 (Year: 2009).*

(Continued)

*Primary Examiner* — Diane M Wills
(74) *Attorney, Agent, or Firm* — Duane Morris LLP

(57) ABSTRACT

A method comprises producing image frames representing evolution of a scene in a field of view of a virtual camera in a virtual environment; and rendering in the image frames an appearance of movement of an environment element in the scene in correspondence with movement of the virtual camera within the virtual environment. In another method the virtual environment may include a virtual camera, an object of interest and an environment element of which at least a portion is located between the virtual camera and the object of interest. The method may comprise producing a sequence of image frames representing evolution of a scene, and over the course of multiple image frames, rendering an appearance of movement of the portion of the environment element to expose more of the object of interest in at least part of the scene previously occupied by the portion of the environment element that was moved.

29 Claims, 11 Drawing Sheets

(56) References Cited

U.S. PATENT DOCUMENTS

| | | | |
|---|---|---|---|
| 2003/0184603 A1 | 10/2003 | Marshall et al. | |
| 2004/0109603 A1* | 6/2004 | Bitter | G06T 15/08 |
| | | | 382/154 |
| 2009/0058856 A1* | 3/2009 | Kuroda | A63F 13/10 |
| | | | 345/427 |
| 2010/0251185 A1* | 9/2010 | Pattenden | A63F 13/10 |
| | | | 715/849 |
| 2017/0113138 A1* | 4/2017 | Makino | A63F 13/5258 |
| 2017/0173468 A1* | 6/2017 | Edsall | A63F 13/5258 |
| 2018/0365883 A1* | 12/2018 | Fillhardt | G06T 15/20 |
| 2019/0174121 A1* | 6/2019 | Asakura | G06F 3/011 |

OTHER PUBLICATIONS

Extended European Search Report dated May 17, 2018, in corresponding EP Patent Application No. 17202834.2.

Rodrigues Dos Santos, S. et al., "Camera control based on rigid body dynamics for virtual environments", Virtual Environments, Human-Computer Interfaces and Measurements Systems, 2009. VECIMS '09. IEEE International Conference on, IEEE, Piscataway, NJ, USA, May 11, 2009 (May 11, 2009), pp. 344-349, XP031470989, ISBN: 978-1-4244-3808-2.

Anonymous: "Collision Boundaries around Navigable View Points", IBM Technical Disclosure Bulletin, vol. 40, No. 3, Sep. 1, 1997 (Sep. 1, 1997), pp. 79-81, XP055473600.

R. Weller: "A Brief Overview of Collision Detection" In: "New Geometric Data Structures for Collision Detection and Haptics", Jul. 25, 2013 (Jul. 25, 2013), Springer International Publishing, Heidelberg, XP 055169735, ISSN: 2192-2977, ISBN: 978-3-31-901020-5, pp. 9-46, DOI: 10.1007/978-3-319-01020-5_2.

* cited by examiner

METHOD AND SYSTEM FOR RENDERING VIDEO GAME IMAGES

FIELD

The present application pertains generally to rendering of images and, more particularly, to rendering of images in the context of video games.

BACKGROUND

The virtual environment of a video game may include various objects such as a virtual camera, a playing character and other objects. In the case of a third-person video game, the virtual camera "sees" the playing character whose actions are controlled by the user. However, sometimes certain objects located between the virtual camera and the playing character obstruct the view of the playing character. This can occur, in particular, when the virtual camera is near a bush or other vegetation. In such cases, the playing character is no longer fully rendered on-screen, and the user (player) may even lose visual contact with his or her own playing character, which can negatively affect the gaming experience. Although moving the position of the virtual camera away from the obstruction appears to be a simple solution, the player does not always have independent control of the position of the virtual camera. Moreover, the vegetation may in some cases remain too impenetrable to the camera no matter where it is placed. A solution to this problem would therefore be welcomed by the industry.

SUMMARY

According to a first broad aspect, there is provided a computer-readable medium comprising computer-readable instructions which, when executed by a processing entity, cause the processing entity to execute a method that comprises: producing image frames representing evolution of a scene in a field of view of a virtual camera in a virtual environment, the scene including an environment element; and rendering in the image frames an appearance of movement of the environment element in correspondence with movement of the virtual camera within the virtual environment.

According to a second broad aspect, there is provided a method that comprises producing image frames representing evolution of a scene in a field of view of a virtual camera in a virtual environment, the scene including an environment element; and rendering in the image frames an appearance of movement of the environment element in correspondence with movement of the virtual camera within the virtual environment.

According to a third broad aspect, there is provided a computer-readable medium comprising computer-readable instructions which, when executed by a processing entity, cause the processing entity to implement a method that comprises: maintaining a virtual environment for a video game, the virtual environment including a virtual camera, an object of interest and an environment element of which at least a portion is located between the virtual camera and the object of interest; producing a sequence of image frames representing evolution of a scene within the video game, the scene including objects from the virtual environment within a field of view of the virtual camera; and over the course of multiple ones of the image frames, rendering an appearance of movement of the portion of the environment element to expose more of the object of interest in at least part of the scene previously occupied by the portion of the environment element that was moved.

According to a fourth broad aspect, there is provided a method comprising: maintaining a virtual environment for a video game, the virtual environment including a virtual camera, an object of interest and an environment element of which at least a portion is located between the virtual camera and the object of interest; producing a sequence of image frames representing evolution of a scene within the video game, the scene including objects from the virtual environment within a field of view of the virtual camera; and over the course of multiple ones of the image frames, rendering an appearance of movement of the portion of the environment element to expose more of the object of interest in at least part of the scene previously occupied by the portion of the environment element that was moved.

DETAILED DESCRIPTION

Figure 1:
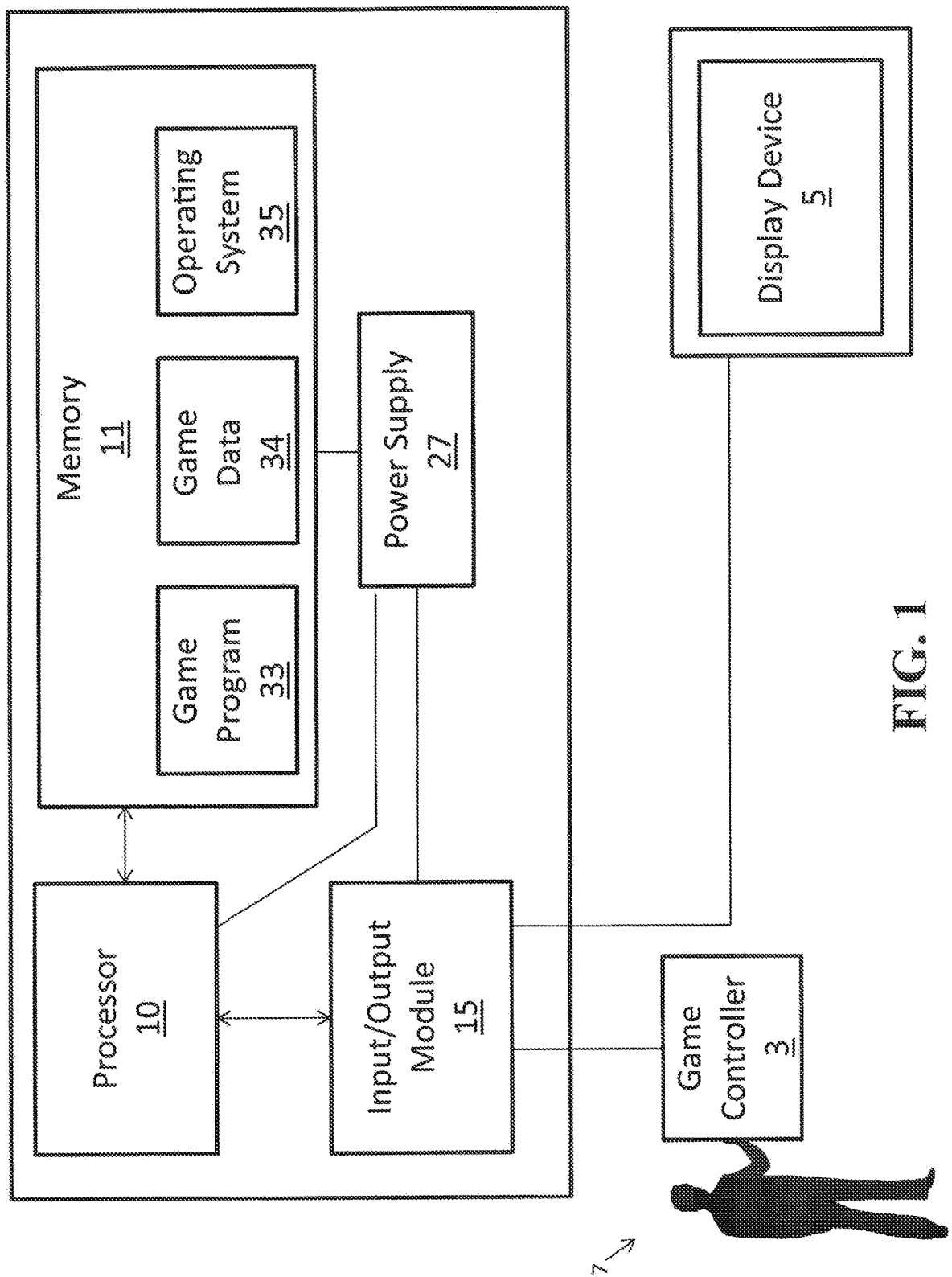
FIG. 1 is a block diagram illustrating a configuration of a game apparatus implementing an example non-limiting embodiment of the present invention.

FIG. 1 is a block diagram illustrating a configuration of a game apparatus 1 implementing an example non-limiting embodiment of the present invention. In some cases, the game apparatus 1 is a dedicated gaming console similar to an Xbox™, Playstation™, or Nintendo™ gaming console. In other cases, the game apparatus 1 is a multi-purpose workstation or laptop computer. In still other cases, the game apparatus 1 is a mobile device such as a smartphone. In yet other cases, the game apparatus 1 is a handheld game console.

The game apparatus 1 includes at least one processor 10, at least one computer readable memory 11, at least one input/output module 15 and at least one power supply unit 27, and may include any other suitable components typically found in a game apparatus used for playing video games. The various components of the game apparatus 1 may communicate with each other over one or more buses, which can be data buses, control buses, power buses and the like.

As shown in FIG. 1, a player 7 is playing a game by viewing game images displayed on a screen of a display device 5 and controlling aspects of the game via a game controller 3. Accordingly, the game apparatus 1 receives inputs from the game controller 3 via the input/output module 15. The game apparatus 1 also supplies outputs to the display device 5 and/or an auditory device (e.g., a speaker, not shown) via the input/output module 15. In other implementations, there may be more than one game controller 3 and/or more than one display device 5 connected to the input/output module 15.

The processor 10 may include one or more central processing units (CPUs) having one or more cores. The processor 10 may also include at least one graphics processing unit (GPU) in communication with a video encoder/video codec (coder/decoder, not shown) for causing output data to be supplied to the input/output module 15 for display on the display device 5. The processor 10 may also include at least one audio processing unit in communication with an audio encoder/audio codec (coder/decoder, not shown) for causing output data to be supplied to the input/output module 15 to the auditory device.

The computer readable memory 11 may include RAM (random access memory), ROM (read only memory), flash memory, hard disk drive(s), DVD/CD/Blu ray™ drive and/or any other suitable memory device, technology or configuration. The computer readable memory 11 stores a variety of information including a game program 33, game data 34 and an operating system 35.

When the game apparatus 1 is powered on, the processor 10 is configured to run a booting process which includes causing the processor 10 to communicate with the computer readable memory 11. In particular, the booting process causes execution of the operating system 35. The operating system 35 may be any commercial or proprietary operating system suitable for a game apparatus. Execution of the operating system 35 causes the processor 10 to generate images displayed on the display device 5, including various options that are selectable by the player 7 via the game controller 3, including the option for the player 7 to start and/or select a video game to be played. The video game selected/started by the player 7 is encoded by the game program 33.

The processor 10 is configured to execute the game program 33 such that the processor 10 is able to perform various kinds of information processing functions related to the video game that it encodes. In particular, and with reference to FIG. 2, execution of the game program 33 causes the processor to execute a game data processing function 22 and game rendering processing function 24, which are now described.

Figure 2:
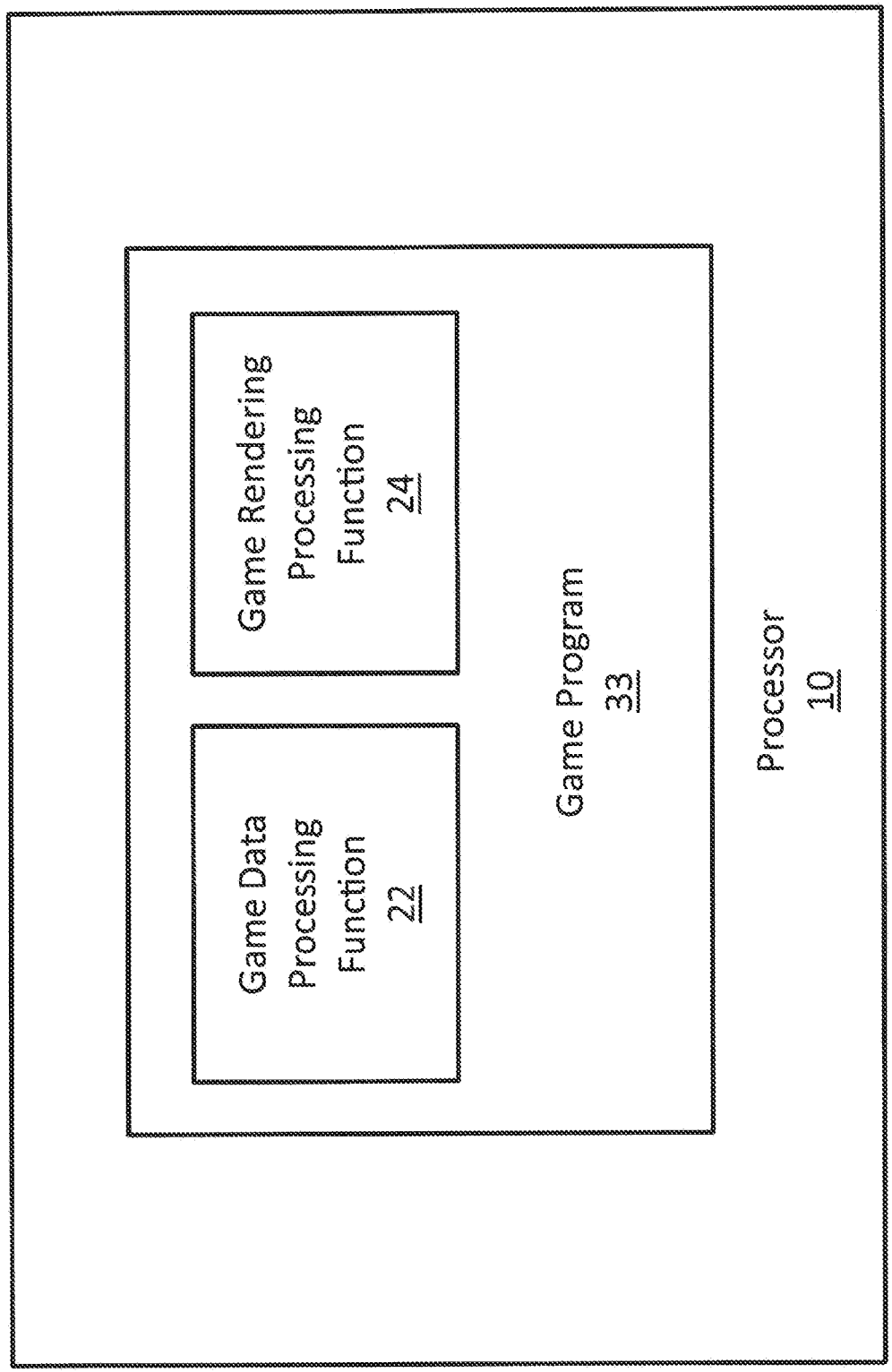
FIG. 2 shows components of a game program executed by the game apparatus of FIG. 1, including a game data processing function and a game rendering processing function.

The game rendering processing function 24 includes generation of a game image to be displayed on the display device 5. For its part, the game data processing function 22 includes processing of information representing progress of the game or a current state of the game (e.g., processing of information relating to the game that is not necessarily displayed on the display device 5). The game data processing function 22 and the game rendering processing function 24 are illustrated in FIG. 2 as forming part of a single game program 33. However, in other embodiments, the game data processing function 22 and the game rendering processing function 24 may be separate programs stored in separate memories and executed by separate, possibly distant, processors. For example, the game data processing function 22 may be performed on a CPU and the game rendering processing function 24 may be performed on a GPU.

Figure 3:
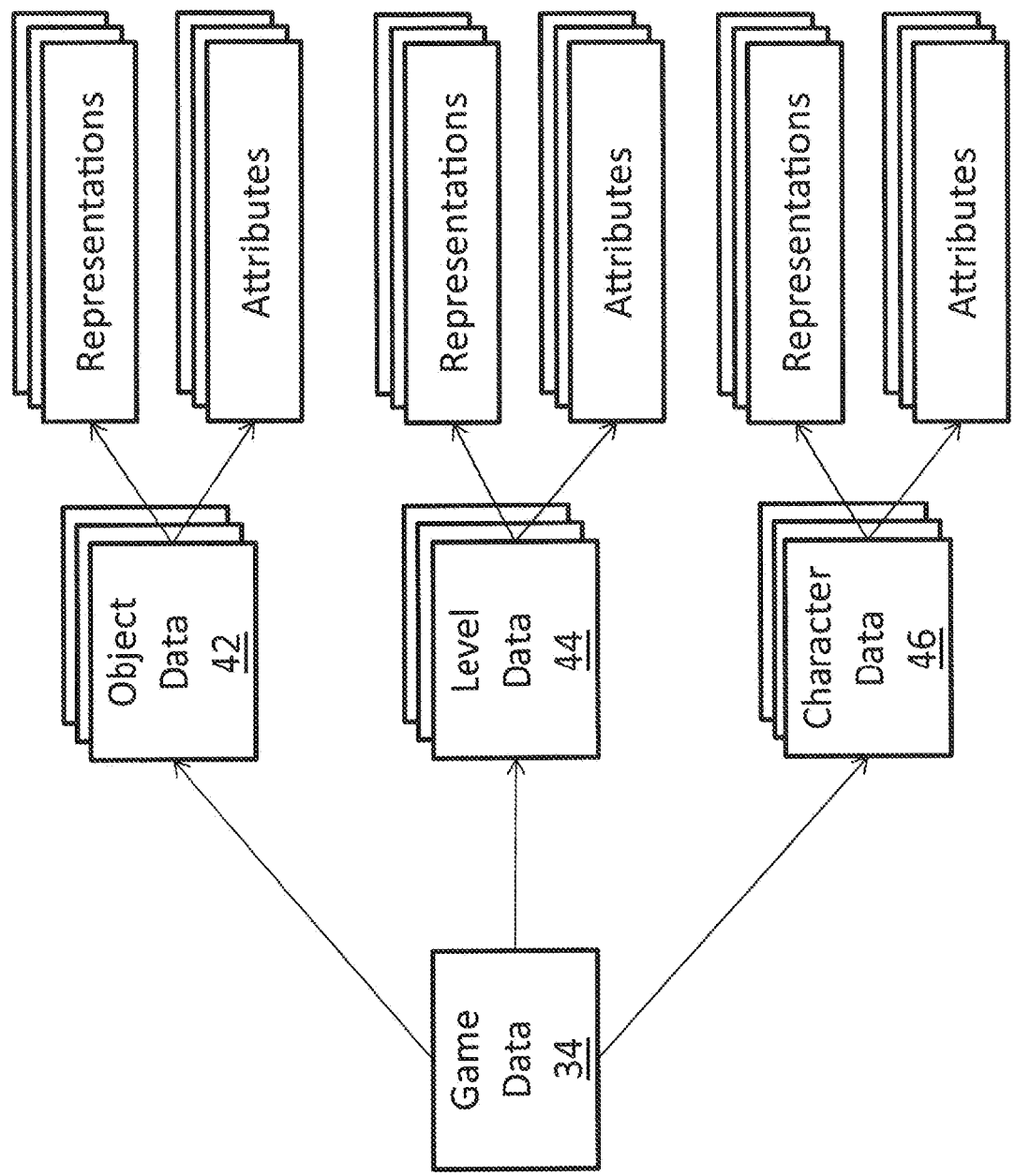
FIG. 3 shows examples of game data according to a present example embodiment.

In the course of executing the game program 33, the processor 10 manipulates constructs such as objects, characters and/or levels according to certain game rules and applying certain artificial intelligence algorithms. In the course of executing the game program 33, the processor 10 creates, loads, stores, reads and generally accesses the game data 34, which includes data related to the object(s), character(s) and/or level(s). FIG. 3 shows an example illustrating examples of game data 34 according to a present example embodiment. The game data 34 may include data related to the aforementioned constructs and therefore may include object data 42, level data 44 and/or character data 46.

An object may refer to any element or portion of an element in the game environment that can be displayed graphically in a game image frame. An object may include 3-dimensional representations of buildings, vehicles, furniture, plants, sky, ground, ocean, sun, and/or any other suitable elements. The object may have other non-graphical representations such numeric, geometric or mathematical representations. The object data 42 stores data relating to the current representation of the object such as the graphical representation in a game image frame or a numeric, geometric or mathematical representation. The object data 42 may also store attributes such as imaging data, position data, material/texture data, physical state data, visibility data, lighting data (e.g., direction, position, color and/or intensity), sound data, motion data, collision data, environment data, timer data and/or other data associated with the object. Certain attributes of an object may be controlled by the game program 33.

A character is similar to an object except that the attributes are more dynamic in nature and it has additional attributes that objects typically do not have. Certain attributes of a playing character may be controlled by the player 7. Certain attributes of a character, be it a playing character or a non-playing character, may be controlled by the game program 33. Examples of characters include a person, an avatar or an animal, to name a few non-limiting possibilities. The character may have other non-visual representations such as numeric, geometric or mathematical representations. A character may be associated with one or more objects such as a weapons held by a character or clothes donned by the character. The character data 46 stores data relating to the current representation of the character such as the graphical representation in a game image frame or a numeric, geometric or mathematical representation. The character data 46 may also store attributes such as imaging data, position data, material/texture data, physical state data, visibility data, lighting data (e.g., direction, position, color and/or intensity), sound data, motion data, collision data, environment data, timer data and/or other data associated with the character.

The game data 34 may also include data relating to the current view or camera angle of the game (e.g., first-person view, third-person view, etc.) as displayed on the display device 5 which may be part of the representations and/or attributes of the object data 42, level data 44 and/or character data 46.

In executing the game program 33, the processor 10 may cause an initialization phase to occur after the player 7 has selected/started the game, causing initialization of the game. The initialization phase is used to carry out any necessary game setup and prepare the game data 34 for the start of the game. The game data 34 changes during the processing of the game program 33 (i.e., during the playing of the game) and the terminology "game state" is used herein to define the current state or properties of the game data 34 and hence the various object data 42, level data 44 and/or character data 46 and their corresponding representations and/or attributes.

After the initialization phase, the processor 10 in execution of the game program 33 may implement one or more game loops. The one or more game loops run continuously during gameplay causing the game data processing function 22 and the game rendering processing function 24 to be routinely performed.

A game loop may be implemented, whereby (i) the game data processing function 22 is performed to process the player's input via the game controller 3 and to update the game state and afterwards (ii) the game rendering processing function 24 is performed to cause the game image to be rendered based on the updated game state for display on the display device 5. The game loop may also track the passage of time to control the rate of gameplay. It should be appreciated that parameters other than player inputs can influence the game state. For example, various timers (e.g., elapsed time, time since a particular event, virtual time of day, etc.) can have an effect on the game state. In other words, the game keeps moving even when the player 7 isn't providing input and as such, the game state may be updated in the absence of the player's input.

In general, the number of times the game data processing function 22 is performed per second specifies the updates to the game state per second (hereinafter "updates per second") and the number of times the game rendering processing function 24 is performed per second specifies game image rendering per second (hereinafter "frames per second"). In theory the game data processing function 22 and the game rendering processing function 24 would be called the same number of times per second. By way of a specific and non-limiting example, if the target is 25 frames per second, it would be desirable to have the game data processing function 22 and the game rendering processing function 24 both being performed every 40 ms (i.e., 1 s/25 FPS). In the case where the game data processing function 22 is performed and afterwards the game rendering processing function 24 is performed, it should be appreciated that both the game data processing function 22 and the game rendering processing function 24 would need to be performed in the 40 ms time window. Depending on the current game state, it should be appreciated that the time of performing the game data processing function 22 and/or the game rendering processing function 24 may vary. If both the game data processing function 22 and the game rendering processing function 24 take less than 40 ms to perform, a sleep timer may be used before performing the next cycle of the game data processing function 22 and the game rendering processing function 24. However, if the game data processing function 22 and the game rendering processing function 24 take more than 40 ms to perform for a given cycle, one technique is to skip displaying of a game image to achieve a constant game speed.

It should be appreciated that the target frames per second may be more or less than 25 frames per second (e.g., 60 frames per second); however, it may be desired that the game data processing function 22 and the game rendering processing function 24 be performed not less than 20 to 25 times per second so that the human eye won't notice any lag in the rendering of the game image frames. Naturally, the higher the frame rate, the less time between images and the more powerful the processor(s) require to execute the game loop, hence the reliance on specialized processor such as GPUs.

In other embodiments, the game data processing function 22 and the game rendering processing function 24 may be separate game loops and hence independent processes. In such cases, the game data processing function 22 may be routinely performed at a specific rate (i.e., a specific number of updates per second) regardless of when the game rendering processing function 24 is performed and the game rendering processing function 24 may be routinely performed at a specific rate (i.e., a specific number of frames per second) regardless of when the game data processing function 22.

It should be appreciated that the process of routinely performing, the game data processing function 22 and the game rendering processing function 24 may be implemented according to various techniques within the purview of the person skilled in the art and the techniques described in this document are non-limiting examples of how the game data processing function 22 and the game rendering processing function 24 may be performed.

When the game data processing function 22 is performed, the player input via the game controller 3 (if any) and the game data 34 is processed. More specifically, as the player 7 plays the video game, the player 7 inputs various commands via the game controller 3 such as move left, move right, jump, shoot, to name a few examples. In response to the player input, the game data processing function 22 may update the game data 34. In other words, the object data 42, level data 44 and/or character data 46 may be updated in response to player input via the game controller 3. It should be appreciated that every time the game data processing function 22 is performed, there may not be any player input via the game controller 3. Regardless of whether player input is received, the game data 34 is processed and may be updated. Such updating of the game data 34 may be in response to representations and/or attributes of the object data 42, level data 44 and/or character data 46 as the representations and/or attributes may specify updates to the game data 34. For example, timer data may specify one or more timers (e.g., elapsed time, time since a particular event, virtual time of day, etc.), which may cause the game data 34 (e.g., the object data 42, level data 44 and/or character data 46) to be updated. By way of another example, objects not controlled by the player 7 may collide (bounce off, merge, shatter, etc.), which may cause the game data 34 e.g., the object data 42, level data 44 and/or character data 46 to be updated in response to a collision.

Figure 4:
FIG. 4 illustrates an example of a process of converting a 3D graphics scene to a game image for display on a display device.

In general the game data 34 (e.g., the representations and/or attributes of the objects, levels, and/or characters) represents data that specifies a three-dimensional (3D) graphics scene of the game. The process of converting a three-dimensional (3D) graphics scene, which may include one or more 3D graphics objects, into two-dimensional (2D) rasterized game image for display on the display device 5 is generally referred to as rendering. FIG. 4 illustrates an example of a process of converting a 3D graphics scene to a game image for display on the display device 5 via the screen. At step 52, the game data processing function 22 processes the data that represents the three-dimensional (3D) graphics scene of the game and converts this data into a plurality of vertex data. The vertex data is suitable for processing by a rendering pipeline 55 (also known as a graphics pipeline). At step 55, the game rendering processing function 24 processes the vertex data according to the rendering pipeline. The output of the rendering pipeline is typically pixels for display on the display device 5 via the screen (step 60).

More specifically, at step 52, the 3D graphics objects in the graphics scene may be subdivided into one or more 3D graphics primitives. A primitive may refer to a group of one or more vertices that are grouped together and/or connected to define a geometric entity (e.g., point, line, polygon, surface, object, patch, etc.) for rendering. For each of the 3D graphics primitives, vertex data is generated at this step. The vertex data of each primitive may include one or more attributes (e.g., position, the color, normal or texture coordinate information, etc.). In deriving the vertex data, a camera transformation (e.g., rotational transformations) may occur to transform the 3D graphics objects in the 3D graphics scene to the current view or camera angle. Also, in deriving the vertex data, light source data (e.g., direction, position, color and/or intensity) may be taken into consideration. The vertex data derived at this step is typically an ordered list of vertices to be sent to the rendering pipeline. The format of the ordered list typically depends on the specific implementation of the rendering pipeline.

At step 55, the game rendering processing function 24 processes the vertex data according to the rendering pipeline. Rendering pipelines are known in the art (e.g., OpenGL, DirectX, etc.); regardless of the specific rendering pipeline used to implement the rendering pipeline, the general process of the rendering pipeline is to create a 2D raster representation (e.g., pixels) of a 3D scene. The rendering pipeline in general calculates the projected position of the vertex data in to two-dimensional (2D) screen space and performs various processing which may take into consideration lighting, colour, position information, texture coordinates and/or any other suitable process to derive the game image (e.g., pixels) for output on the display device 5 (step 60).

In some cases, the game apparatus 1 is distributed between a server on the internet and one or more internet appliances. Plural players may therefore participate in the same online game, and the functionality of the game program (the game rendering processing function and/or the game data processing function) may be executed at least in part by the server.

The game environment of a video game may be a virtual environment that includes various objects such as a virtual camera, a playing character and several environment elements and other objects. A position and an angle of the camera within the virtual environment define a field of view, which would include objects in a region of the virtual environment that expands from the virtual camera generally outwards. Only a subset of the objects in the field of view of the virtual camera would be "visible" from the virtual camera and rendered on-screen for a player of the game in control of the playing character. Which objects are visible is a function of the transparency of the objects in the field of view as well as their interposition relative to the virtual camera (also referred to as their Z-buffer position).

Figure 5:
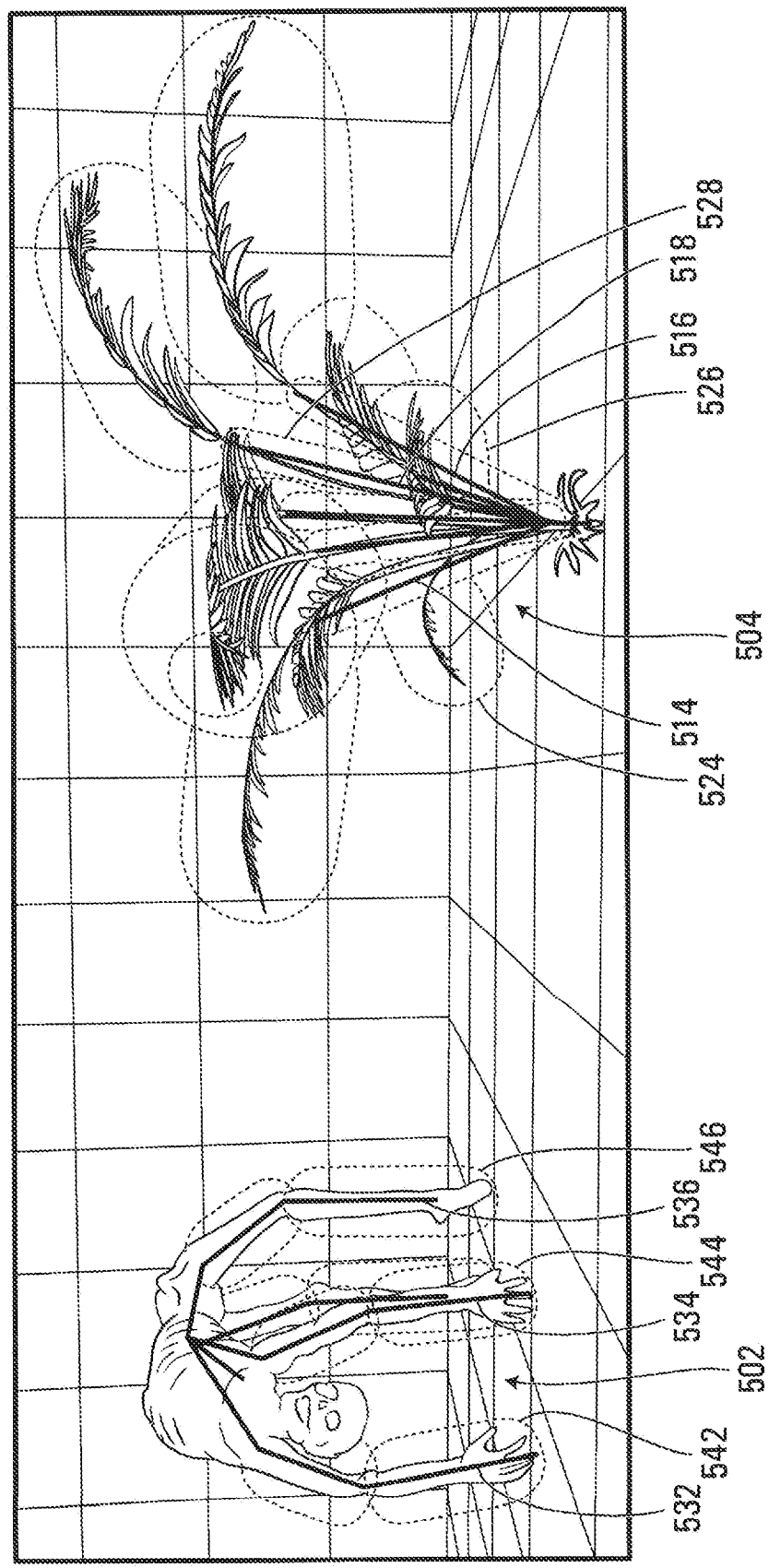
FIG. 5 is a schematic view of an example scene including collision primitives associated with various environment elements.

Regarding the environment elements, some may be flexible. Examples of suitable environment elements that are flexible include objects such as a plant (including reeds, branches, leaves, vines, algae, . . . ), an inanimate object (e.g., flags, bead curtains, vertical blinds, . . . ), a corpse, etc. FIG. 5 shows a corpse 502 and a plant 504 as non-limiting examples of environment elements that are flexible. As illustrated, each environment element is associated with one or more "bones" (segments) and corresponding "collision primitives" that are not rendered on-screen but are used in collision calculations, as will be described later on. For example, the plant 504 includes a plurality of branches, and each branch is represented by one or more bones 514, 516, 518 with a corresponding surrounding collision primitive 524, 526, 528 having a simple shape, such as a capsule (e.g., a cylinder capped at either end by a hemisphere). Similarly, the corpse 502 is represented by an arrangement of bones 532, 534, 536, surrounded by corresponding capsule-like collision primitives 542, 544, 546. When an environment element is associated with multiple bones and corresponding capsule-like collision primitives, the capsules may be of different dimensions. The radius of the hemisphere at either end of a given capsule can be a variable that is definable at runtime. In other embodiments, the collision primitives need not be capsules, and they may instead be prisms or other three-dimensional shapes.

The environment elements 502, 504 have the property of being flexible. Moreover, there exists a natural position in the virtual environment towards which each of the environment elements may be biased, either by resilience or by gravity. For example, in the case of a resilient reed represented by a single bone, a base point is provided, around which the bone pivots. The bone has a natural position in the virtual environment and its resilience may be defined by a biasing force towards the natural position while continuously attached to the base point, which remains immobile in the virtual environment. If the biasing force is overcome by another object colliding with the bone's collision primitive, the resilient reed is rendered as swinging about the base point and, due to its resilience, the resilient reed will be caused to return to its natural position if/when the object is removed.

In more complex examples with multiple interconnected bones, such as the plant 504 or the corpse 502 of FIG. 5, a base point is provided for each bone, around which the corresponding bone pivots, but the base point is also movable within the virtual environment. As such, during a collision, there is a transfer of forces between bones. For example, consider that the bones have a natural position and that their resilience may be defined by a biasing force towards the natural position while continuously attached to the corresponding base point. If the biasing force is overcome by another object colliding with a particular bone's collision primitive (e.g., 524, 526, 528, 542, 544, 546), the associated branch, limb, etc. is rendered as swinging about the base point, but a certain fraction of the force of impact will be transmitted to other bones connected to the impacted bone. The connected bones will therefore experience motion which could further be transferred to other connected bones, and so on. If and when the object is removed, the bones may, due to their resilience, be rendered as returning to their natural positions.

Figure 6:
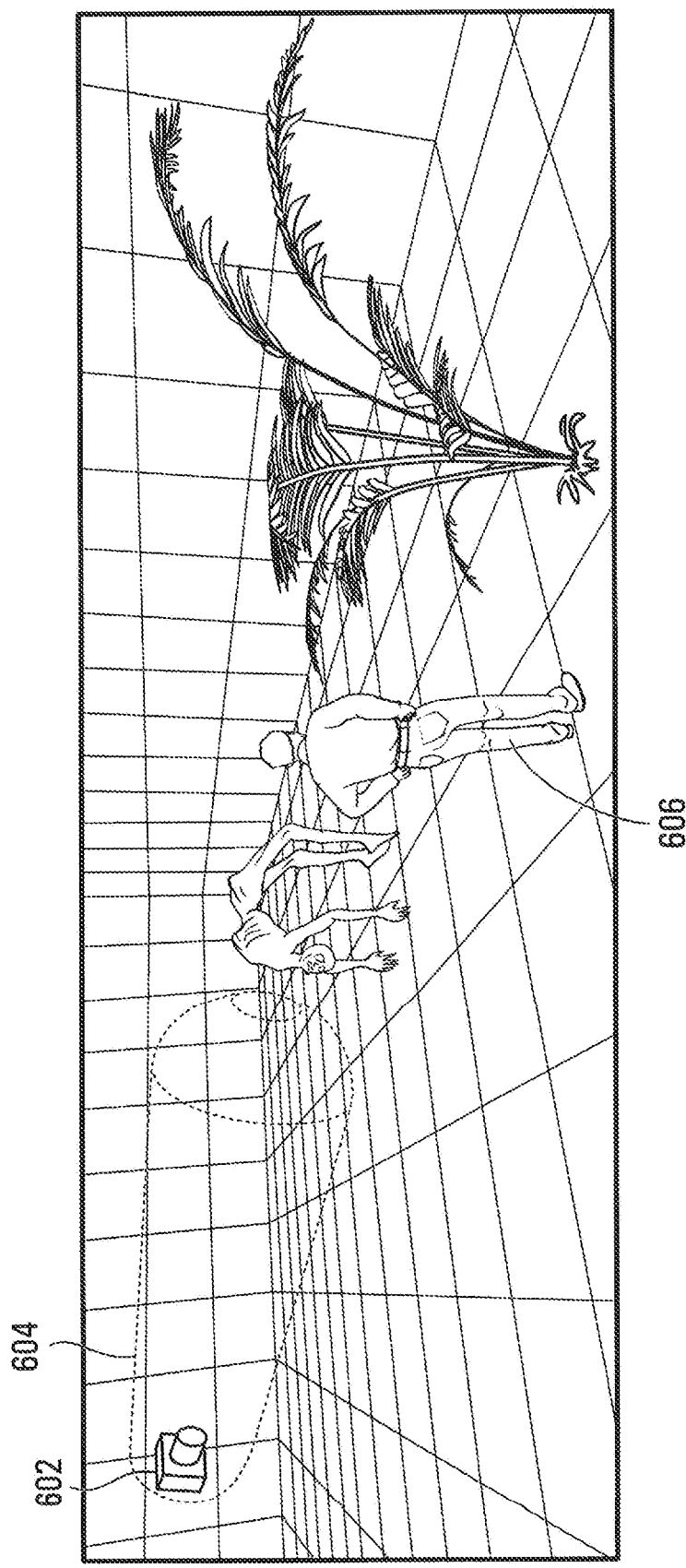
FIG. 6 is a schematic view of the scene of FIG. 5 but from a perspective that shows a virtual camera and an associated camera collision primitive, as well as a character.

In accordance with certain embodiments, a collision primitive associated with the virtual camera may collide with an environment element (or, more specifically, with its collision primitive as discussed above). Specifically, and with reference to FIG. 6, a virtual camera 602 is associated with its own collision primitive 604 (hereinafter referred to as a "camera collision primitive") which, although not rendered on-screen, is used in collision calculations, as will be described later on. Additional details regarding the camera collision primitive 604 are now described with continued reference to FIG. 6. Specifically, in some embodiments, the virtual camera 602 is located within the camera collision primitive 604 (e.g., at an end thereof). In other embodiments the camera collision primitive 604 is located in front of the virtual camera 602, between the virtual camera 602 and an object of interest. In one embodiment, the game is a third-person game and the object of interest is the playing character 606. The virtual camera 602 and the playing character 606 may move relative to one another but the virtual camera 602 will continually be oriented to include the playing character 606 and thus the camera collision primitive 604 is located between the virtual camera 602 and the playing character 606. Movement of the virtual camera 602 may include any of a translation of the virtual camera 602 within the virtual environment and a change in orientation of the virtual camera 602 relative to a fixed location within the virtual environment.

The camera collision primitive 604 may have many possible shapes, one of which is a capsuloid. A capsuloid is a 3D shape of a certain length with two ends, capped by hemispheres of potentially different radii at either end. The radius of the hemisphere at the end of the camera collision primitive 604 that is closer to the virtual camera 602 may be smaller than the radius of the hemisphere at the end of the camera collision primitive 604 that is closer to the playing character 606. The radii of the hemispheres at the ends of the capsuloid can be variables that are definable at runtime. Also, the camera collision primitive 604 need not extend the length of the distance between the virtual camera 602 and the playing character 606. Rather, the camera collision primitive 604 may extend only part of the length, e.g., it may end at a point that is 90%, 75%, 50%, or less than half of the distance between the virtual camera 602 and the playing character 606. This length of the capsuloid, in either absolute terms or in terms relative to the distance between the virtual camera 602 and the playing character 606, can be a variable that is definable at runtime.

Figure 7:
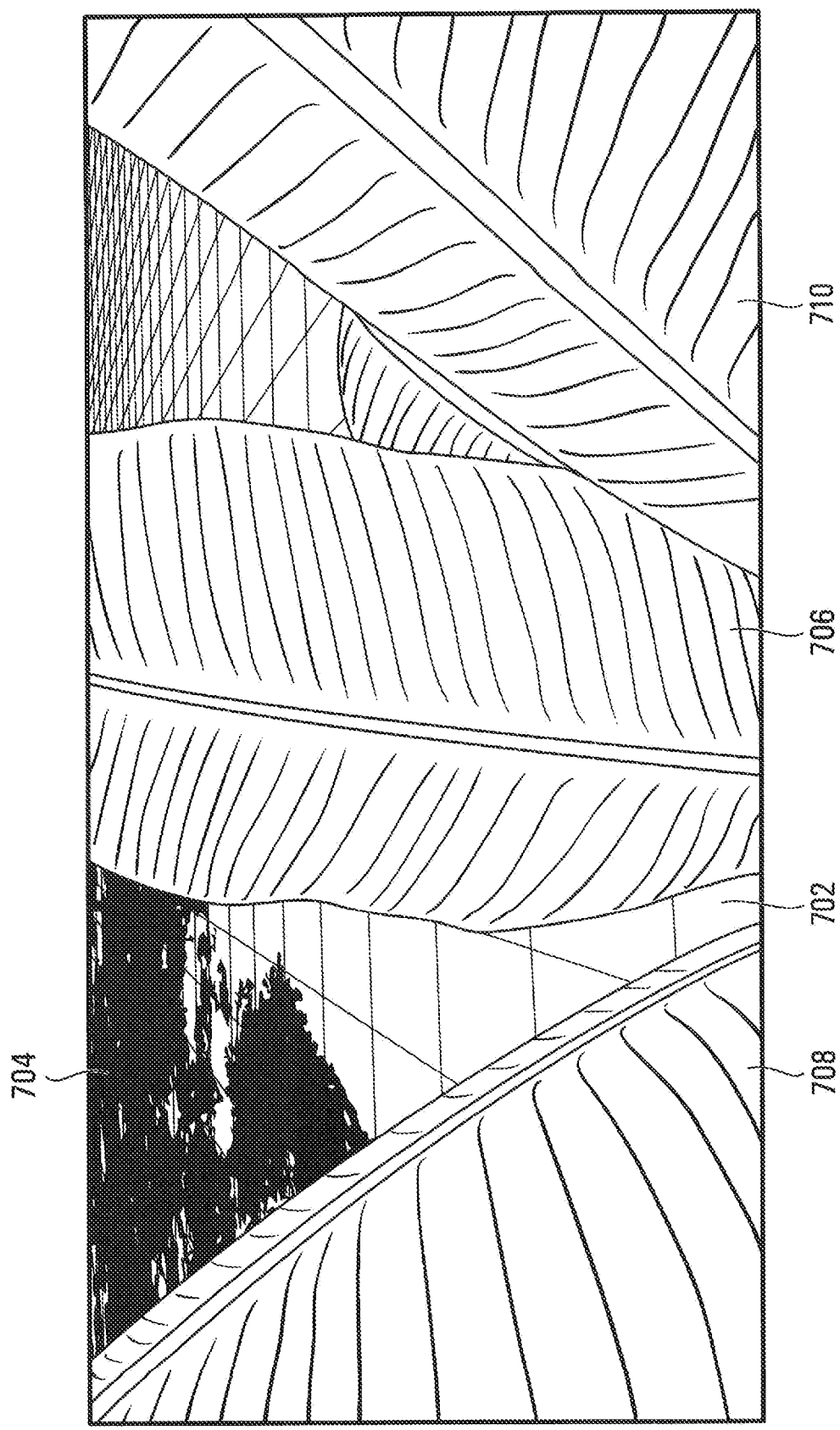
FIG. 7 is a view of an on-screen rendering of an example scene in which rendering of a character is precluded by rendering of an environment element (vegetation) "in front of" the character.

Turning now to FIG. 7, there is shown an example third-person view from the virtual camera 602 (the virtual camera is not shown in FIG. 7), which includes objects that are visible in the field of view of the virtual camera. In the present example, the visible objects include a floor 702, a shadow 704 and leaves 706, 708, 710. The leaves 706, 708 and 710 are flexible and resilient, and their natural position is illustrated in FIG. 7. The leaves 706, 708 and 710 are part of a common plant and thus may be associated with bones that are interconnected to one another, such that movement of each leaf has an impact on the others. The view of FIG. 7 represents the view that would be rendered on-screen without any effect of the camera collision primitive 604 (not shown in FIG. 7) and does not show the playing character 606, which is in a position "behind" leaf 706 where it is obstructed from view. It is seen that visibility of the playing character 606 is significantly obstructed by at least one object, including an environment element (in this case leaf 706).

According to an embodiment, one or more environment elements (in this case leaves 706, 708, 710) can be bent out of the way as a consequence of a collision between the camera collision primitive 604 and the collision primitives (not shown in FIG. 7) associated with the leaves 706, 708, 710, as will now be described.

Figure 11:
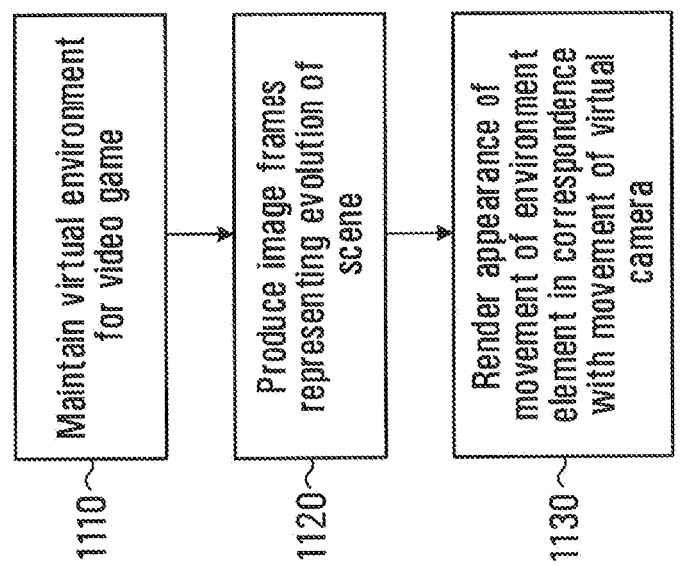
FIG. 11 is a flowchart illustrating steps in a process for rendering an appearance of movement of an environment element, in accordance with a non-limiting embodiment.

An overview of a rendering process that may be executed by the processing entity (e.g., the processor 10) is now presented with reference to FIG. 11. At step 1110, the processing entity maintains the virtual environment for the video game. It is recalled that the virtual environment may include the virtual camera 602, an object of interest (such as the playing character) and an environment element of which at least a portion is located between the virtual camera and the object of interest (such as leaf 706). At step 1120, the processing entity produces a sequence of image frames representing evolution of a scene within the video game, e.g., as part of the game rendering processing function 24. The scene includes objects from the virtual environment within the field of view of the virtual camera. At step 1130, over the course of multiple ones of the image frames, the processing entity renders an appearance of movement (e.g., flexion) of the portion of the environment element in correspondence with movement of the virtual camera 602 within the virtual environment. Part of the scene that was previously occupied by a portion of the environment element that was moved is replaced with a previously unexposed part of the object of interest. In this way, more of the object of interest is exposed in at least part of the scene that was previously occupied by the portion of the environment element that was moved.

Figure 8:
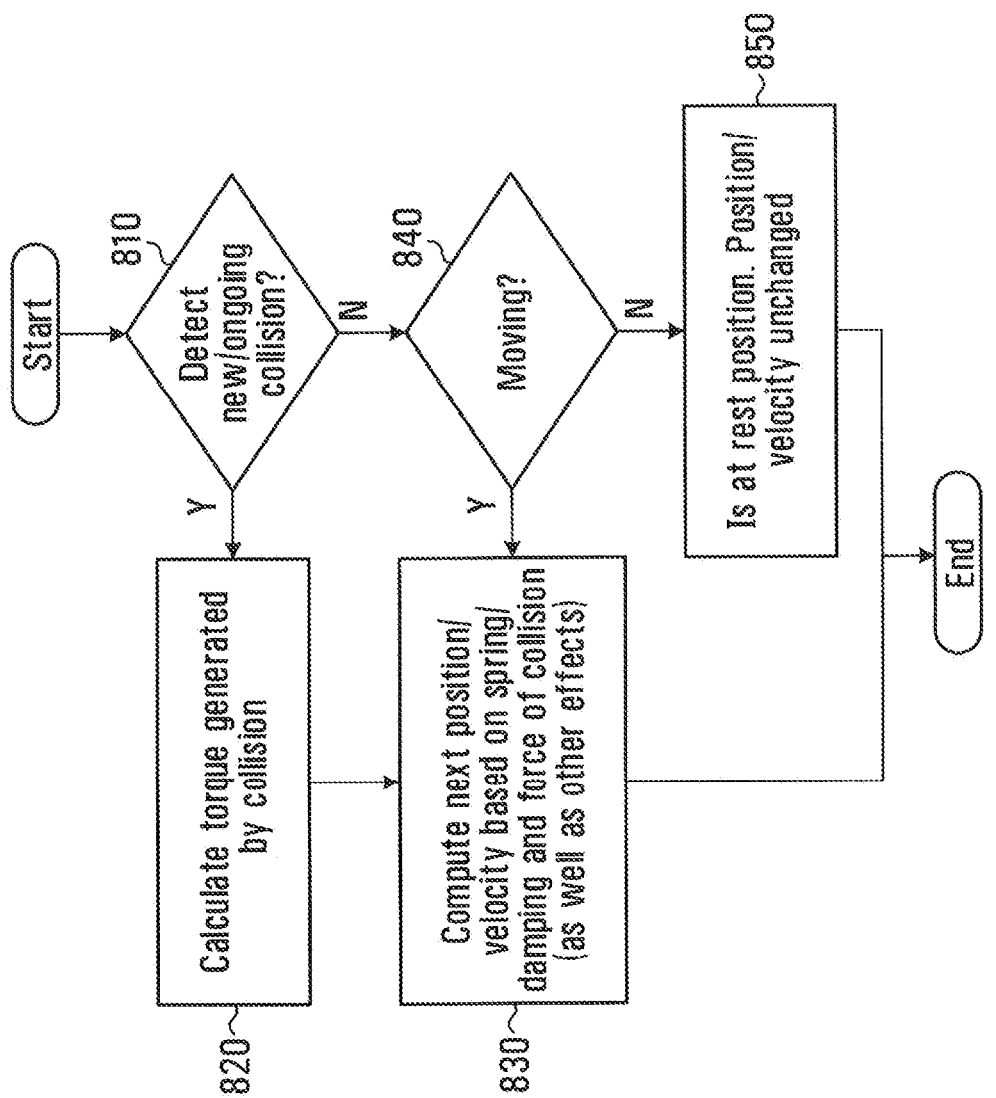
FIG. 8 is a flowchart illustrating steps in a process for computing movement of an environment element subjected to a collision between its collision primitive and a camera collision primitive, in accordance with a non-limiting embodiment.

To this end, reference is made to FIG. 8, which shows steps in a process to cause the appearance of movement of an environment element that would otherwise obstruct the view of the playing character from the virtual camera. The process may be encoded in computer readable instructions executed by the processing entity. The process may apply to some or all segments of some or all environment elements in the scene that have associated collision primitives. The process may be executed at each frame, although this is not a requirement and the process may be executed less frequently to save computational resources. It is assumed that the camera collision primitive 604 has been defined; this may be done in an initialization phase.

At step 810, the processing entity detects whether there is a new or ongoing collision between the collision primitive of a particular segment of the environment element and the camera collision primitive. A collision may be considered "new" when the camera collision primitive associated with a moving virtual camera is found to enter into contact with the collision primitive of the particular segment. In some cases, a collision may last a single frame. In other cases, a collision lasts at least several frames and therefore in subsequent frames what was first considered a "new" collision is then considered an "ongoing" collision. It should be appreciated that a collision can be detected as "ongoing" at step 810 even when the virtual camera has come to a standstill, as there is still contact between the camera collision primitive and the collision primitive of the particular segment.

If a new or ongoing collision is indeed detected at step 810, then the process leads to step 820 where the "contact torque" is determined, namely the computes the force on the collision primitive of the particular segment (and/or the torque about its base point) generated by the collision. A non-limiting technique for performing a computation of the "contact torque" is described later on.

It should be appreciated that when a collision is detected between the camera collision primitive and at least one collision primitive of the environment element, the virtual camera is not itself colliding with that environment element or even with its collision primitive. The environment element may be close enough to the virtual camera so as to obstruct its view, without actually being in contact therewith.

After computation at step 820 of the contact torque generated by the collision, the process proceeds to step 830, where the next position and velocity of the particular segment are calculated according to a set of mathematical equations that depend on, among other things, the contact torque computed at step 820. A non-limiting technique for performing this computation is described later on. Basically, the contact torque computed at step 820 competes with other torques that may be applied about the base point of the segment, resulting in a sum of torques, which then causes movement of the particular segment (unless the sum is zero). An example of a competing torque may come from the inherent resiliency of the environment element, or from gravity.

If no new or ongoing collision was detected at step 810, then the process leads to step 840, where the processing entity determines whether the particular segment was in motion.

If at step 840 the processing entity determines that the particular segment is in motion, the processing entity proceeds to step 830 where, as previously described, the next position and velocity of the particular segment are calculated according to a set of mathematical equations. It should be appreciated that since there is no longer a new or ongoing collision, movement will no longer be due to a contact torque, but rather based on the other factors in the game, including but not limited to exertion of a biasing force to return the particular environment element to its natural position, or a force arising from movement of another segment of the environment element that is connected to the particular segment for which the process is being executed.

If at step 840 the processing entity determines that the particular segment was not in motion, then the next step is step 850, where the position and velocity of the particular segment remain unchanged by this process.

It will be appreciated that equilibrium may ultimately be reached between the camera collision primitive and the collision primitive associated with a particular environment element. At such equilibrium, the sum of the torques is zero. In this regard, consider now FIG. 9, which illustrates the equilibrium state having been reached between a capsule-like collision primitive 904 of a corn stalk 902 and a camera collision primitive 906 (viewed transversely, from the vantage point of the large end of the capsuloid). It is noted that the collision primitive 904 is slightly pivoted relative to the bottom part of the illustration, as a result of the collision with the camera collision primitive 906. As such, the corn 902 is rendered as moved/bent. The zero-sum torque arises from the contact torque being counterbalanced by the resiliency of the corn 902.

Figure 9:
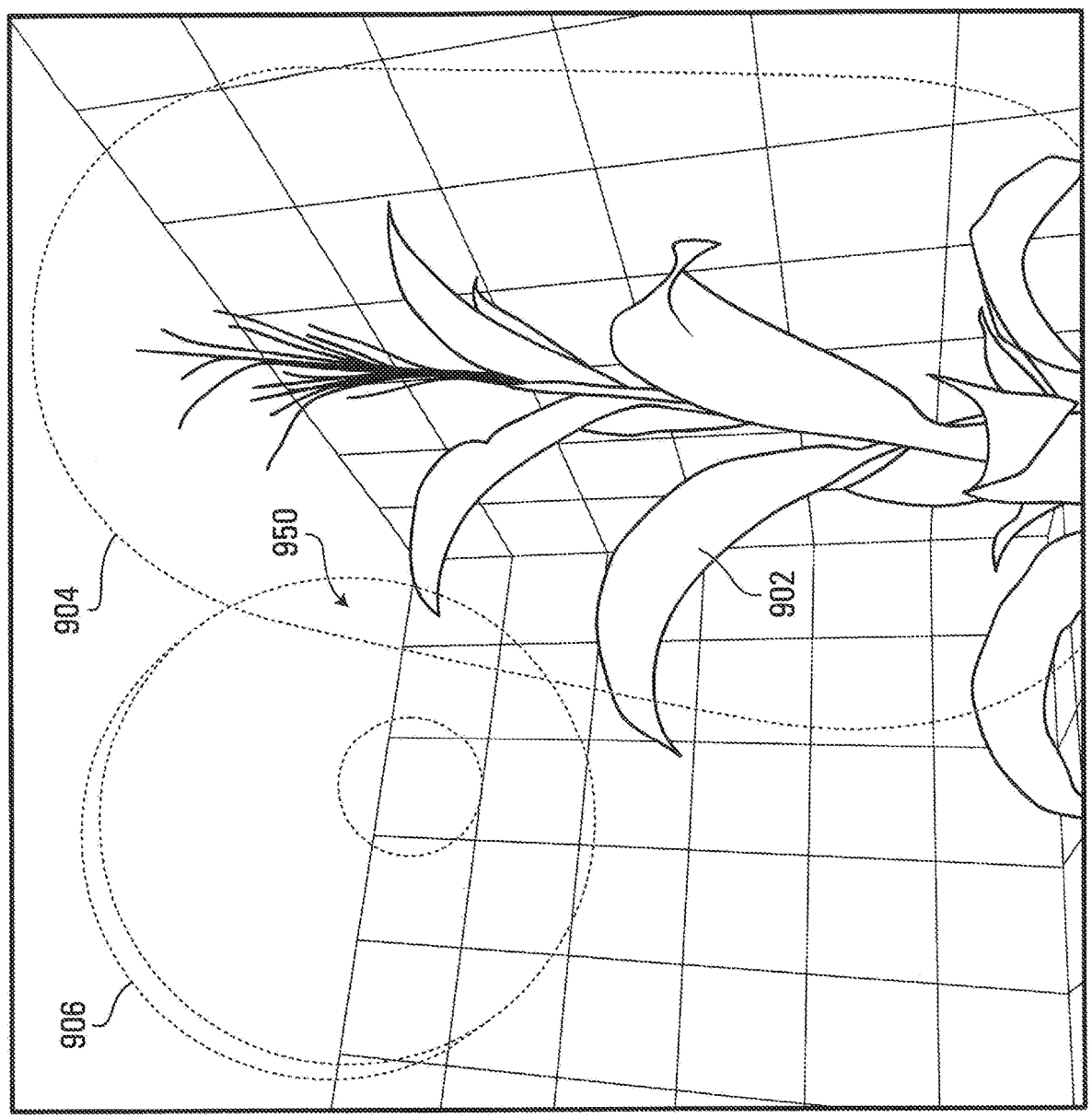
FIG. 9 is a schematic view showing an example of interpenetration of a camera collision primitive and a collision primitive of an environment element at equilibrium.

It is also seen in FIG. 9 that there is some interpenetration 950 of the collision primitive 904 and the camera collision primitive 906 at equilibrium in this embodiment. In other embodiments, the collision primitive 904 of the corn 902 and the camera collision primitive 906 may be constrained to reach equilibrium without any interpenetration. This would result in the corn 902 being rendered as even more bent, since its collision primitive 904 would be pushed away even more by the camera collision primitive 906, whose position is closely tied to the position of the virtual camera 602 as determined by the game program depending on the controls exerted by the user.

Figure 10:
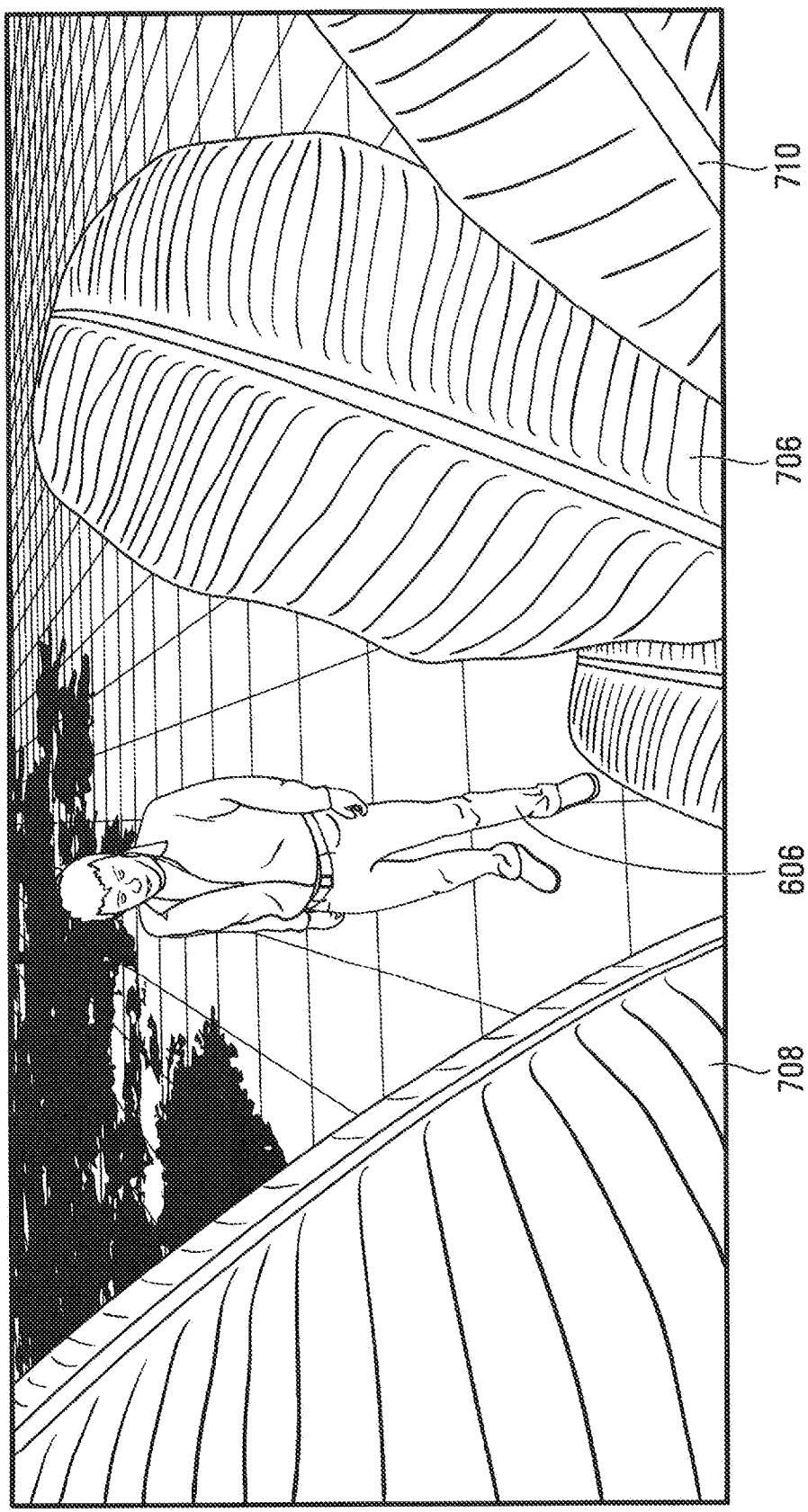
FIG. 10 is a view of an on-screen rendering of the scene of FIG. 7 but in which the vegetation has been moved out of the way to allow the character to be rendered on-screen and seen by the viewer.

Returning now to the example of the leaves 706, 708, 710 in FIG. 7, and assuming that each leaf is represented by an individual collision primitive and that the leaves are connected to a common stem or stalk (that is beyond the bottom of the Figure), reference is now made to FIG. 10, which visually demonstrates the effect of the process of FIG. 8 after equilibrium has been reached. In particular, it is seen that leaf 706, which had been obstructing the view of the playing character from the virtual camera, is now moved and out of the way, and the previously hidden playing character 606 is now visible. In particular, the processing entity has caused clearing of the field of view of the virtual camera by rendering an appearance of movement of leaf 706.

It will also be observed from comparing FIG. 7 to FIG. 10 that leaf 708 has also slightly moved, although in a direction towards the center of the image, i.e., towards the camera collision primitive (though not shown in FIG. 10). This is due to the fact that significant movement of leaf 706 towards the right provoked slight movement of leaf 708 towards the right since leaves 706 and 708 are connected to the same stalk. The degree to which transfer of motion takes place is dependent on the level of sophistication of the game program. In any event, should there be a significant rightwards force on leaf 708 due to the game program, the process of FIG. 8, when executed for the collision primitive of leaf 708, would detect a collision with the camera collision primitive and thus would also ensure that leaf 708 does not, for its own part, end up obstructing the line of sight between the virtual camera and the playing character.

The aforementioned clearing of the field of view of the virtual camera is dynamically ongoing as the virtual camera moves within the virtual environment and new environment elements are moved due to newly detected collisions between their respective collision primitives and the camera collision primitive.

Non-Limiting Algorithm for Computing the Contact Torque

A non-limiting algorithm for executing step 830 in order to compute the next position and velocity of an environment element further to detection of a collision (between the camera collision primitive and the collision primitive of environment element) is now described. Here, the next position and velocity are considered to be angular measurements, as the collision primitive of the environment element pivots about a base point, although this need not be the case in every embodiment. Generally speaking, the environment element may be modeled as a damped spring with an initial natural position and a resilience defined by a spring constant, but again, this need not be the case in every embodiment.

With reference to FIG. 8, a first step is to find the two closest points in 3D on the segments in the colliding primitives, shown as P1 for the collision primitive of the flexible element (in this case, a branch) and P2 for the camera collision primitive. Once the two closest points are found, one proceeds to find the point Pb, which is the base point around which the branch revolves. In the present non-limiting model, the branch only rotates, and does not translate or stretch, although this more complex behaviour may be accounted for in other embodiments. Parent and child branches will also affect each other in a complex way, which is taken care of by the game program.

The collision of the camera collision primitive with the collision primitive of a particular branch will generate a rotation or pivoting of that branch, as now described. First, the vector d is defined as the vector going from P2 to P1:

$$\vec{d} = P_1 - P_2$$

And its direction (unit vector) is described as follows:

$$\hat{d} = \frac{\vec{d}}{|\vec{d}|}$$

One may use a formula for the force generated by the collision between the camera collision primitive and the collision primitive associated with the branch, such as:

$$\vec{F_c} = \hat{d} \cdot \left(1 - \frac{|\vec{d}|}{r}\right) \cdot m \quad \text{(eq. 1)}$$

where $r = r_1 + r_2$, in which $r_2$ is the radius of the camera collision primitive colliding with the branch (for a capsuloid with 2-radii capsule, $r_2$ it is the radius at the collision point) and $r_1$ is the radius of the capsule of the branch. These parameters may be inputs to the user. The fact that the term in parentheses is unity minus a ratio ensures that there is a maximum force when the capsule/capsuloid are the most interlaced and the length of d (the minimum distance between the colliding primitives) is 0.

The factor m may be tweaked with multiple values:

$$m = (f + f_v) \cdot \mu \cdot p$$

where f is the main factor and is entered by a user for each environment element that has flexible segments. Also, p is a multiplier entered by the user, and depends on the camera collision primitive. The factor μ is another multiplier so that branches react differently when its collision primitive collides with characters or with the camera collision primitive. Finally, the factor fv is a velocity effect multiplier, so if a character runs into the branch, the plants will move more than if a character moves slowly into it:

$$f_v = v \cdot f \cdot s$$

where v is the norm of the velocity of the virtual camera (or character running into the branch) and s is a speed effect multiplier (which may be user definable).

As such, Eq. 1 above computes the force that the branch receives, each frame, from colliding geometries between its collision primitive and (in this case) the camera collision primitive. This force is applied continuously, and lasts for as long as the primitives are interpenetrating. When they are barely in contact, the force will be very small, and it will increase with the interpenetration, leading to smooth movements. Note that the geometries might still be interpenetrating at the rest/equilibrium position.

The force computed above is used to generate the contact torque, since the branch rotates about its base point. The lever used for the contact torque is:

$$\vec{L} = P_1 - P_b$$

Thus, the contact torque generated on the branch is:

$$\vec{T_c} = \vec{L} \times \vec{F_c} \quad \text{(eq. 2)}$$

Non-Limiting Algorithm for Computing the Next Position and Velocity

Branches and certain other flexible environment elements may be simulated as damped springs. During the same frame where the contact torque is calculated, the spring force model is simulated and resulting torques are added to the contact torque. It is noted that the branch uses torques, thus the quantities are angular in nature.

In the simulation, the damping force opposes the velocity of the branch and is calculated as:

$$\vec{T_d} = -\omega \cdot k \cdot \vec{V} \quad \text{(eq. 3)}$$

where k is a constant that the user can enter, and it is referred to as the "damping factor". ω is the natural frequency of the system and it also may be user-definable. V denotes the angular velocity.

Added to the damping force, a spring force opposes the displacement of the branch and is calculated as:

$$\vec{T_s} = -\omega^2 \cdot \vec{X} \quad \text{(eq. 4)}$$

in which ω (also used in Eq. 3) is the natural frequency of the system. Note that X is the angular position of the branch.

The next angular position can be found knowing the current position. The following equations of motion can be used:

$$\vec{X_{t+\Delta t}} = \vec{X_t} + \frac{d\vec{X}}{dt} \cdot \Delta t + \frac{1}{2} \cdot \frac{d^2\vec{X}}{dt^2} \cdot (\Delta t)^2$$

where Δt is one frame duration, and, by definition velocity is the derivative of position $$\vec{V} = \frac{d\vec{X}}{dt}$$

and acceleration is the second order derivative of the position $$\vec{a} = \frac{d^2\vec{X}}{dt^2},$$

leading to the following equation:

$$\vec{X_{t+\Delta t}} = \vec{X_t} + \vec{V_t} \cdot \Delta t + \frac{\vec{a}}{2} \cdot (\Delta t)^2 \quad \text{(eq. 5)}$$

To be able to use Eq. 5, one still needs V, the velocity, which changes every frame and a, the acceleration. For the velocity, one can use a first degree approximation, still using an equation of motion:

$$\vec{V_{t+\Delta t}} = \vec{V_t} + \frac{d\vec{V}}{dt} \cdot \Delta t$$

It is known that acceleration is the derivative of velocity:

$$\vec{a} = \frac{d\vec{V}}{dt}.$$

This leads to Eq. 6:

$$\vec{V_{t+\Delta t}} = \vec{V_t} + \vec{a} \cdot \Delta t \quad \text{(eq. 6)}$$

In both Eq. 5 and Eq. 6, one needs to determine the value of the acceleration. It is known from Newton that $\vec{F}=m\cdot\vec{\alpha}$. For convenience, since there are many parameters, m=1 is used. Since torques are being used, the acceleration is the sum of all torques:

$$\vec{\alpha}=\vec{T_c}+\vec{T_d}+\vec{T_s}=\vec{T_{tot}}$$

Thus, the final equations to calculate the next angular position and velocity for the frame are the following:

$$\vec{X_{t+\Delta t}} = \vec{X_t} + \vec{V_t}\cdot \Delta t + \frac{1}{2}\cdot \vec{T_{tot}}\cdot (\Delta t)^2 \quad \text{(eq. 7)}$$

$$\vec{V_{t+\Delta t}} = \vec{V_t} - \vec{T_{tot}}\cdot \Delta t \quad \text{(eq. 8)}$$

It should further be appreciated that under the damped spring model, the environment element has a tendency (defined by the spring constant) to want to return to its natural position. The natural position may be reassumed when the virtual camera moves away such that there is no more contact between the collision primitive of the environment element and the camera collision primitive.

In an alternative embodiment, the environment element may be allowed to return to its natural position even when there is still contact between the collision primitive of the environment element and the camera collision primitive. This can be arranged to happen when the virtual camera is immobile or has a velocity less than a certain threshold. That is to say, the camera collision primitive ceases to have a field-of-view clearing effect at low speeds. Thus, as a result of the return of the environment element to its natural position, it may re-obstruct visibility of the playing character from the virtual camera (as in FIG. 7). While this may detrimentally prevent the player from fully seeing the playing character, it may be perceived as added realism for certain flexible environment elements. For example, consider a bead curtain with strings of beads hanging vertically from a horizontal beam at a certain distance between the virtual camera and the playing character. The strings of beads have a tendency to want to return to a straight vertical position under gravity. Although the player may appreciate that the bead curtain will be moved away from the field of view of the virtual camera during an active scene so that the playing character can be more clearly seen (i.e., rendered), the player may equally appreciate the realism that arises from the bead curtain reverting to a vertical orientation when the scene becomes static. This may be perceived as more realistic compared to the bead curtain espousing a phantom shape corresponding to the camera collision primitive.

In still other embodiments, the environment element may be allowed to return to its natural position as soon as the playing character is removed from the theoretical field of view of the virtual camera (i.e., the playing character is no longer visible irrespective of any obstruction in front of the virtual camera).

Figure 12:
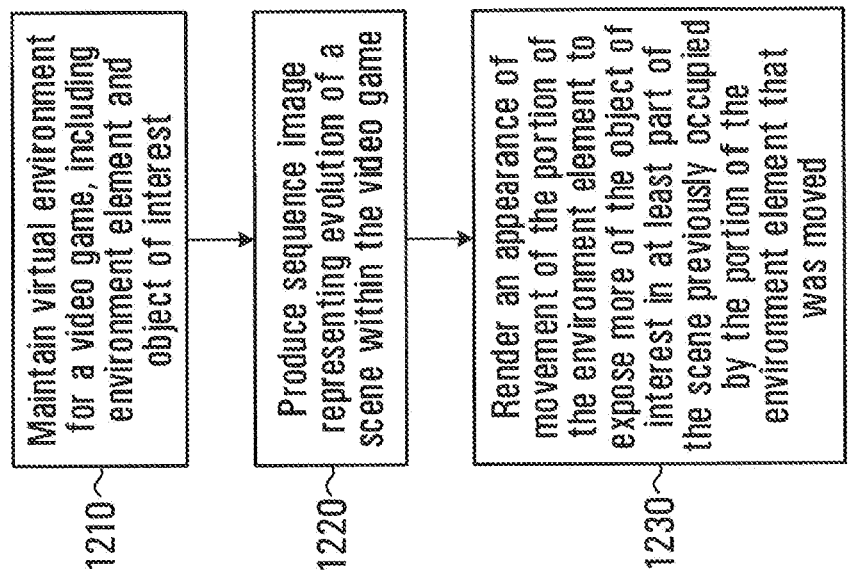
FIG. 12 is a flowchart illustrating steps in a process for rendering an appearance of movement of an environment element, in accordance with another non-limiting embodiment.

As such, and with reference to FIG. 12, there has been provided a process that includes a step 1210 of maintaining a virtual environment for a video game. The virtual environment includes a virtual camera, an object of interest and an environment element of which at least a portion is located between the virtual camera and the object of interest. The method includes a step 1220, at which a sequence of image frames is produced, representing evolution of a scene within the video game. The scene includes objects from the virtual environment within a field of view of the virtual camera. The process further includes a step 1230, which includes rendering an appearance of movement of the portion of the environment element to expose more of the object of interest in at least part of the scene previously occupied by the portion of the environment element that was moved, as illustrated, for example, in the change visible between the on-screen renderings of FIGS. 7 and 10. This may be done over the course of multiple ones of the image frames. It is noted that although the virtual camera itself is not visible, effects are felt through movements of, and collisions involving, its camera collision primitive.

Those skilled in the art should appreciate that further realizations and variants are possible, and that certain embodiments may omit certain elements described above, all within the scope of the invention, which is defined by the claims appended hereto.

What is claimed is:

1. A non-transitory computer-readable medium storing instructions for execution by a processing entity, wherein execution of the instructions by a processing entity implements a method that comprises:

producing image frames representing evolution of a scene in a field of view of a virtual camera in a virtual environment, the scene including an environment element and a playing character controlled by a player of a video game;

rendering in the image frames an appearance of movement of the environment element in correspondence with movement of the virtual camera within the virtual environment;

over the course of multiple ones of the image frames, replacing at least part of the scene previously occupied by a portion of the environment element that was moved with a previously unexposed part of the playing character;

detecting an occurrence of a collision between a camera collision primitive and at least one collision primitive of the environment element, wherein said rendering an appearance of movement of the environment element is carried out responsive to said detecting, wherein after the collision, the movement of the environment element reaches an equilibrium at which the camera collision primitive and the at least one collision primitive of the environment element interpenetrate;

wherein the camera collision primitive is a virtual 3D shape extending at least partly between the virtual camera and the playing character, and wherein the at least one collision primitive of the environment element at least partly surrounds the environment element.

2. The non-transitory computer-readable medium defined in claim 1, wherein neither the camera collision primitive nor the collision primitive of the environment element are rendered in the image frames.

3. The non-transitory computer-readable medium defined in claim 1, wherein the 3D shape is a capsuloid with identical or different radii of curvature.

4. The non-transitory computer-readable medium defined in claim 1, wherein the 3D shape has an elongate shape with a first end and a second end, the first end being proximate the virtual camera, the second end being located between the virtual camera and the playing character.

5. The non-transitory computer-readable medium defined in claim 4, wherein 3D shape tapers towards the first end.

6. The non-transitory computer-readable medium defined in claim 4, wherein 3D shape has a length dimension between the first end and the second end, and has a crosssection transverse to the length dimension that is smaller, on average, within the half of the 3D shape nearer the virtual camera than within the half of the 3D shape nearer the playing character.

7. The non-transitory computer-readable medium defined in claim 6, wherein the length of the camera collision primitive is a variable defined at runtime.

8. The non-transitory computer-readable medium defined in claim 4, wherein 3D shape expands in size outwards from the virtual camera towards the playing character.

9. The non-transitory computer-readable medium defined in claim 4, wherein the second end is located approximately half way between the virtual camera and the playing character.

10. The non-transitory computer-readable medium defined in claim 4, wherein the second end is located no more than three quarters of the way between the virtual camera and the playing character.

11. The non-transitory computer-readable medium defined in claim 1, wherein the at least one collision primitive of the environment element includes a virtual 3D shape surrounding the environment element.

12. The non-transitory computer-readable medium defined in claim 11, wherein at least one of the at least one collision primitive of the environment element includes a capsule.

13. The non-transitory computer-readable medium defined in claim 12, wherein movement of the environment element comprises flexion of the capsule about a base point.

14. The non-transitory computer-readable medium defined in claim 13, wherein the base point is not within the field of view of the virtual camera.

15. The non-transitory computer-readable medium defined in claim 1, wherein when the environment element is modeled as a bone, the at least one collision primitive of the environment element includes a virtual 3D shape surrounding the bone.

16. The non-transitory computer-readable medium defined in claim 1, wherein when the environment element is modeled as a plurality of interconnected bones, the at least one collision primitive of the environment element includes an arrangement of virtual 3D shapes surrounding respective ones of the bones.

17. The non-transitory computer-readable medium defined in claim 1, wherein a degree of movement of the environment element corresponds to a torque applied to the collision primitive of the environment element.

18. The non-transitory computer-readable medium defined in claim 17, wherein the method further comprises computing the applied torque.

19. The non-transitory computer-readable medium defined in claim 18, wherein computing the applied torque comprises computing a function of a collision torque produced by the collision and a resilience associated with the environment element.

20. The non-transitory computer-readable medium defined in claim 1, wherein before movement of the environment element, the environment element occupied a natural position, and wherein the method further comprises rendering the environment element as returning to its natural position after additional movement of the virtual camera.

21. The non-transitory computer-readable medium defined in claim 1, wherein before movement of the environment element, the portion of the environment element that was moved occupied a natural position, and wherein the method further comprises rendering the portion of the environment element as returning to its natural position after detecting that there is no longer a collision between the camera collision primitive and the collision primitive of the portion of the environment element.

22. The non-transitory computer-readable medium defined in claim 1, wherein when a collision is detected between the camera collision primitive and at least one collision primitive of the environment element, the virtual camera is not in a collision with the environment element.

23. The non-transitory computer-readable medium defined in claim 1, wherein movement of the virtual camera within the virtual environment includes any of a translation of the virtual camera within the virtual environment and a change in orientation of the virtual camera relative to a fixed location within the virtual environment.

24. The non-transitory computer-readable medium defined in claim 1, wherein movement of the virtual camera is a result of input received from a player of the video game and processed by the processing entity.

25. The non-transitory computer-readable medium defined in claim 1, wherein the environment element is any of a plant, a reed, a branch, a leaf, a vine, algae, a flag, a bead curtain, a vertical blind and a corpse.

26. The non-transitory computer-readable medium defined in claim 1, wherein the camera collision primitive ends at a point that is 50% to 90% of the distance between the virtual camera and the playing character.

27. A method comprising:
producing image frames representing evolution of a scene in a field of view of a virtual camera in a virtual environment, the scene including an environment element and a playing character controlled by a player of a video game;
rendering in the image frames an appearance of movement of the environment element in correspondence with movement of the virtual camera within the virtual environment;
over the course of multiple ones of the image frames, replacing at least part of the scene previously occupied by a portion of the environment element that was moved with a previously unexposed part of the playing character;
detecting an occurrence of a collision between a camera collision primitive and at least one collision primitive of the environment element, wherein said rendering an appearance of movement of the environment element is carried out responsive to said detecting, wherein after the collision, the movement of the environment element reaches an equilibrium at which the camera collision primitive and the at least one collision primitive of the environment element interpenetrate;
wherein the camera collision primitive is a virtual 3D shape extending at least partly between the virtual camera and the playing character, and
wherein the at least one collision primitive of the environment element at least partly surrounds the environment element.

28. A non-transitory computer-readable medium storing instructions for execution by a processing entity, wherein execution of the instructions by a processing entity implements a method that comprises:
maintaining a virtual environment for a video game, the virtual environment including a virtual camera, a playing character controlled by a player of a video game and an environment element of which at least a portion is located between the virtual camera and the playing character;

producing a sequence of image frames representing evolution of a scene within the video game, the scene including objects from the virtual environment within a field of view between the virtual camera and the playing character;

over the course of multiple ones of the image frames, rendering an appearance of movement of the portion of the environment element to expose more of the playing character in at least part of the scene previously occupied by the portion of the environment element that was moved;

detecting an occurrence of a collision between a camera collision primitive and at least one collision primitive of the environment element, wherein said rendering an appearance of movement of the environment element is carried out responsive to said detecting, wherein after the collision, the movement of the environment element reaches an equilibrium at which the camera collision primitive and the at least one collision primitive of the environment element interpenetrate;

wherein the camera collision primitive is a virtual 3D shape extending at least partly between the virtual camera and the playing character, and wherein the at least one collision primitive of the environment element at least partly surrounds the environment element.

29. A method comprising:

maintaining a virtual environment for a video game, the virtual environment including a virtual camera, a playing character controlled by a player of a video game and an environment element of which at least a portion is located between the virtual camera and the playing character;

producing a sequence of image frames representing evolution of a scene within the video game, the scene including objects from the virtual environment within a field of view between the virtual camera and the playing character;

over the course of multiple ones of the image frames, rendering an appearance of movement of the portion of the environment element to expose more of the playing character in at least part of the scene previously occupied by the portion of the environment element that was moved;

detecting an occurrence of a collision between a camera collision primitive and at least one collision primitive of the environment element, wherein said rendering an appearance of movement of the environment element is carried out responsive to said detecting, wherein after the collision, the movement of the environment element reaches an equilibrium at which the camera collision primitive and the at least one collision primitive of the environment element interpenetrate;

wherein the camera collision primitive is a virtual 3D shape extending at least partly between the virtual camera and the playing character, and wherein the at least one collision primitive of the environment element at least partly surrounds the environment element.

\* \* \* \* \*